United States Patent [19]

Remer

[11] 4,453,372

[45] Jun. 12, 1984

[54] GRASS EDGER AND TRIMMER ATTACHMENT

[76] Inventor: Fred J. Remer, Box 74, Spiro, Okla. 74959

[21] Appl. No.: 452,063

[22] Filed: Feb. 28, 1983

[51] Int. Cl.³ .................................................. A01D 35/26
[52] U.S. Cl. ......................................... 56/13.7; 56/11.6; 56/16.9; 56/256; 56/DIG. 4
[58] Field of Search ...................... 56/12.7, 11.6, 16.9, 56/256, 17.5, 13.7, DIG. 4

[56] References Cited

U.S. PATENT DOCUMENTS

| 3,782,085 | 1/1974 | Parker et al. | 56/16.9 |
| 3,789,591 | 2/1974 | Emery | 56/16.9 |
| 4,170,099 | 10/1979 | Owens | 56/12.7 |

*Primary Examiner*—Jay N. Eskovitz
*Attorney, Agent, or Firm*—R. L. Phillips

[57] ABSTRACT

A universal grass edger and trimmer attachment is disclosed utilizing a rotary flexible drive shaft whose operating end is supported by a multipositional boom.

4 Claims, 7 Drawing Figures

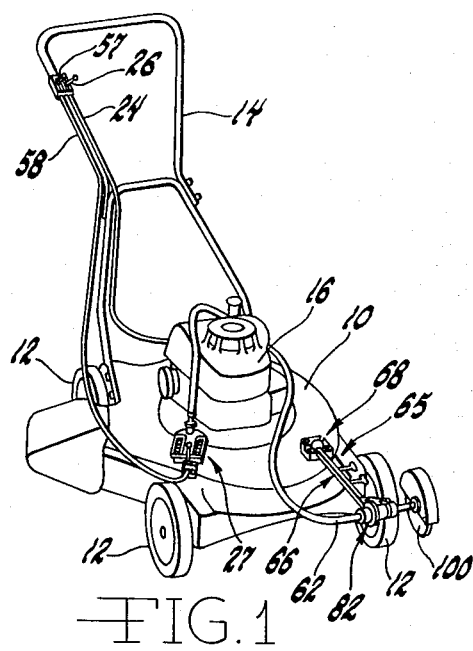
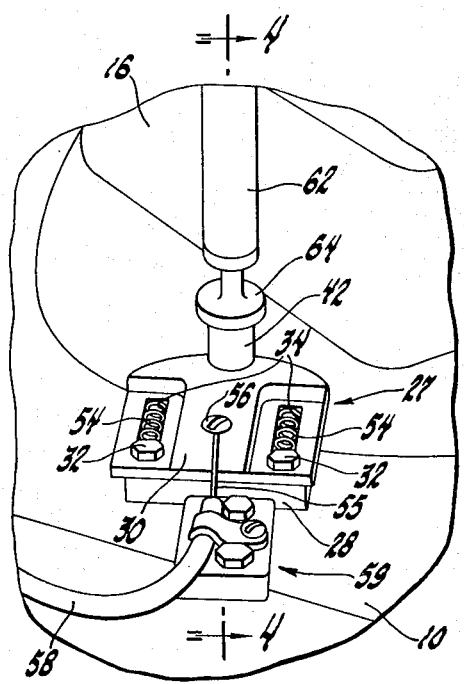
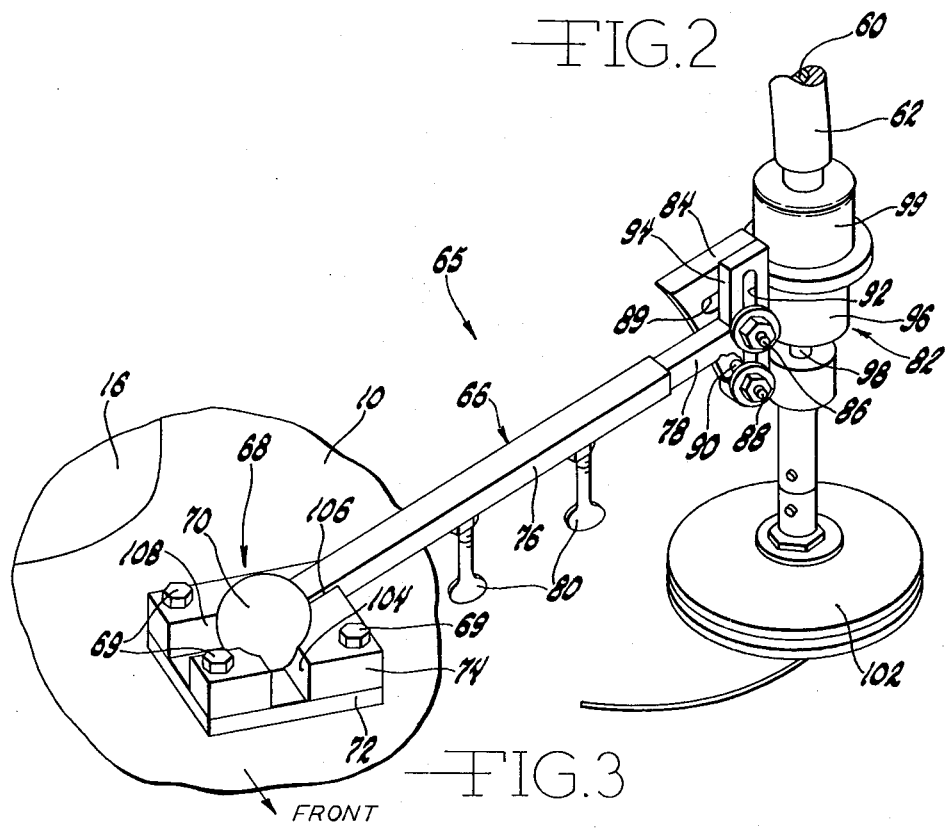

GRASS EDGER AND TRIMMER ATTACHMENT

This invention relates to a grass edger and trimmer attachment and more particularly to a universal grass edger and trimmer attachment adapted to be simply and easily mounted on and driven by a rotary lawn mower.

In lawn maintenance, the most widely used implement is the gasoline engine powered rotary lawn mower while grass edging and trimming is commonly left to separate devices which are typically powered by either a small electric motor or gasoline engine. Efforts have been made to combine a grass edger and trimmer attachment with the common rotary lawn mower; however, they are generally complex and require substantial or otherwise undesirable modifications of the mower to receive the attachment. Moreover, they are typically limited in their range of adaptability as well as in their range of adjustment or positioning on the mower. For example, see the edger and trimmer attachments disclosed is U.S. Pat. Nos. 2,771,730; 2,790,292; 2,854,804; 2,908,127; 2,910,817; 3,053,035; 3,236,037; 3,319,406; 3,425,196; 3,531,922; 3,668,845; 3,710,563; 3,789,591; and 4,170,099.

The present invention is an improvement over such prior edger and trimmer attachments in providing a simple low cost universal grass edger and trimmer attachment that is adapted to be readily mounted on and driven by the conventional modern rotary lawn mower. Typically, such a lawn mower comprises a wheeled mower housing that is pushed or self-propelled, a gasoline engine that is mounted on top of and has one end of its crankshaft extending vertically downward through the mower housing and a mower blade that is fixed to the engine shaft beneath the mower housing. The universal grass edger and trimmer attachment of the present invention is adapted thereto with a drive mounting arrangment including a selectively operable drive transmitting mechanism having a base that is simply and easily mounted on top of the mower housing. Drive is transmitted to the cutter not by a belt but by a rotary flexible drive shaft having a drive end that connects to the drive mounting arrangement and a driven end that is remote therefrom and is adapted to have a grass edger and trimmer fixed thereto. The drive transmitting mechanism is adapted to extend vertically downward through a single access opening formed in the top of the mower housing and is further adapted together with the engine shaft at a location beneath the mower housing and above the mower blade so as to provide a driving connection between the flexible drive shaft and the engine shaft on selective operation. The driven end of the flexible drive shaft is rotatably supported at one end of a boom that is provided at its opposite end with a manually adjustable ball and socket mounting arrangement. The latter is adapted to be simply and easily mounted on top of the mower housing so as to provide selective manual positioning and support of the driven end of the flexible drive shaft in a storage position on top of the mower housing, one operating position in front thereof and another operating position to one side thereof as determined by the boom engaging and resting in upwardly facing angularly spaced slots associated with the socket. The boom further includes a manually operable length adjuster and also a heighth adjuster for respectively providing distance and heighth adjustment of the driven end of the flexible drive shaft relative to the mower housing. Moreover, the boom also includes a manually operable indexer for providing selective indexing of the driven end of the flexible drive shaft to a horizontal axis edger position and, alternatively, a vertical axis trimmer position in both the operating positions thereof relative to the mower housing.

Thus, the grass edger and trimmer attachment according to the present invention requires only a minimal amount of adaptation of the conventional modern rotary lawn mower to accommodate its incorporation and use therewith yet it is very simple in design and of low-cost construction while providing a wide range of positions including both front and side operating positions and additionally a storage position on top of the mower housing.

These and other objects and advantages of the present invention will become more apparent from the following description and drawing in which:

FIG. 1 is an isometric view of a conventional modern rotary lawn mower having the preferred embodiment of the universal grass edger and trimmer attachment according to the present invention adapted to and mounted thereon; the attachment being shown in a front operating position.

FIG. 2 is an enlarged isometric view of the base mounting arrangement of the grass edger and trimmer attachment in FIG. 1.

FIG. 3 is an enlarged isometric view of the operating end of the grass edger and trimmer attachment in a side operating position.

Figure 4:
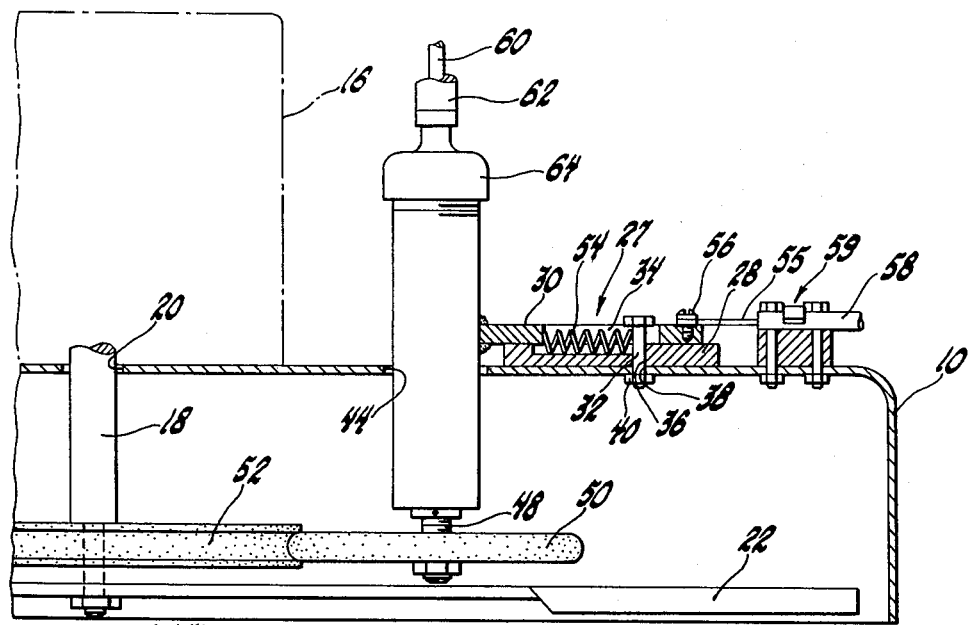
FIG. 4 is a view taken along the line 4—4 in FIG. 2.

Referring to FIG. 1, there is shown a typical conventional modern push type rotary lawn mower having a mower housing 10 which is supported on wheels 12 and is pushed with a handle 14. A gasoline engine 16 is mounted on top of the mower housing and has the lower projecting end of its crankshaft 18 extending vertically downward through an opening 20 in the housing as shown in FIG. 4. A mower blade 22 is fixed to the engine shaft beneath the mower housing and the engine is controlled through a sheathed wire 24 by a throttle lever 26 which is mounted on the handle 14.

The preferred embodiment of the universal grass edger and trimmer attachment according to the present invention is adapted to be simply and easily mounted on such a conventional modern rotary lawn mower with minimum modifications thereto as provided by a drive mounting arrangement 27 which as best shown in FIGS. 2 and 4 comprises a base plate 28 which fixedly mounts directly on top the mower housing 10 and a slide plate 30 which is slidably mounted on top the base plate. The plates are secured in place by a pair of shoulder bolts 32 which extend through parallel slots 34 in the slide plate, holes 36 in the base plate and holes 38 in the mower housing. Nuts 40 are threaded to the ends of the bolts 32 beneath the housing thereby holding the base plate 28 in fixed position while the slide plate 30 is permitted to slide relative thereto under the guidance of the bolts in the slots 34 and in a direction toward or away from the engine shaft to provide selective drive engagement as described in detail later. A cylindrical sleeve 42 is welded at a point midlength thereof to one end of the slide plate and extends vertically downward with substantial clearance through a hole 44 in the mower housing. A short drive shaft 48 is rotatably mounted and retained in fixed axial position in the sleeve and at its lower end has a friction wheel 50 fixed thereto. The friction wheel 50 is engageable with a friction wheel 52 of larger diameter mounted on the engine shaft 18 beneath the housing and above the mower blade so as to provide a frictional drive connection between the engine shaft and the attachement drive shaft which is parallel thereto. This drive is made selectively engageable by movement of the slide plate 30 which is biased in the direction of friction drive wheel engagement, i.e. toward the engine shaft, by a pair of coil springs 54 which are each mounted between one of the mounting-guide bolts 32 and one end of the associated slot 34 in the slide plate. Disengagement is accomplished by provision of a sheathed wire 55 that is connected at one end by a fastener 56 to the slide plate 30 and is connected at the other end to a lever 57 mounted on the mower handle adjacent the engine throttle lever 26. The sheath 58 on the wire 56 is fixed to the top of the mower housing by a clip assembly 59 at a location adjacent the drive mounting assembly 27.

Drive is transmitted in the attachment by a sheathed rotary flexible drive shaft 60 whose drive end has a square socket drive coupling connection with the upper end of the drive shaft 48, the sheath 62 on the flexible drive shaft having a collar 64 which is threadably secured to the upper end of the sleeve. The flexible drive shaft 60 is supported and adapted at its other end to drive an edger or trimmer or some other tool. To support the latter end of the flexible drive shaft, the attachment further includes a second mounting arrangement 65 comprising a boom 66 which is mounted with a ball and socket device 68 at one thereof on top of the mower housing at the right front corner as viewed in the drawings. The ball and socket device comprises a two-piece socket assembly which is secured at three of its corners by bolts 69 to the top of the mower housing and has a socket formed therein that retains a ball 70 fixed to the base end of the boom, the socket assembly being formed in two pieces 72 and 74 to facilitate the machining thereof and provide for ball retainment. The boom 66 is formed in two pieces 76 and 78 so as to be adjustable lengthwise and to that end the boom piece 76 with the ball end is formed as a female member which telescopically receives the other male boom piece 78 and retains the latter in the desired position with two thumb screws 80.

A flexible drive shaft mounting arrangement 82 is secured to the operating end of the boom and comprises a bracket 84 which is detachably secured and angularly adjustable relative to the boom by the provision of two bolts 86 and 88 which extend through a slot 89 and hole 90 respectively in the bracket and through a single right angle slot 92 in a T-extension 94 formed on the end of the male boom member. The bracket 84 has a cylindrical sleeve 96 fixed thereto in which a short driven shaft 98 is rotatably mounted and axially contained therein like the drive shaft 48. The flexible drive shaft 60 has a square socket coupling connection with one end of the shaft 98 and its sheath 62 is secured by a threaded collar 99 to one end of the sleeve 96. The shaft 98 extends outward of the other end of its supporting sleeve and is adapted at the end thereof to have attached thereto an edger 100 (see FIG. 1) or trimmer 102 (see FIG. 3).

Figure 5:
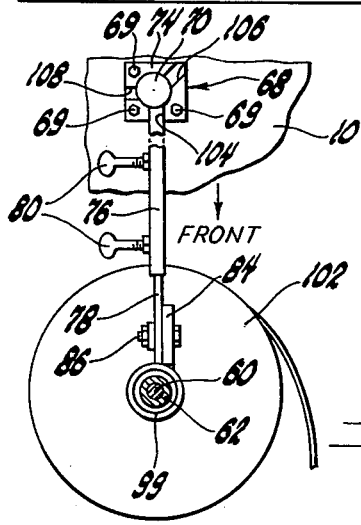
FIG. 5 is a partial plan view showing the operating end of the grass edger and trimmer attachment in another front operating position.
Figure 6:
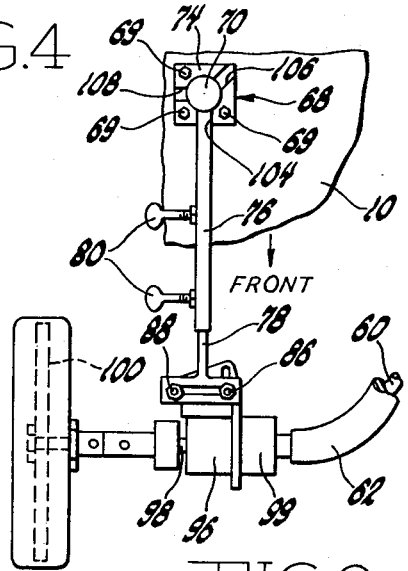
FIG. 6 is a partial plan view showing the operating end of the grass edger and trimmer attachment in another front operating position.
Figure 7:
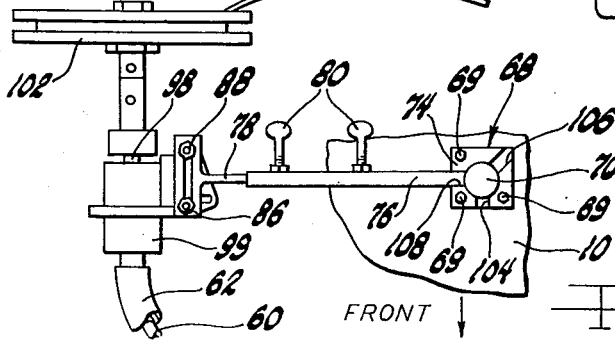
FIG. 7 is a partial plan view showing the operating end of the grass edger and trimmer attachment in a storage position on top of the lawn mower.

The upper socket plate 74 has three radial slots 104, 106, 108 which are formed and located so as to support and locate the boom 66 in a front position in front of the mower housing as shown in FIGS. 1, 5 and 6, a side position to one side of the mower housing as shown in FIG. 3 and a storage position on top of the mower housing as shown in FIG. 7, the weight of the boom and its load being sufficient to retain such positions. As can be seen in the various positions, the adjustment provided in the length of the two-piece boom 66 permits the edger or trimmer to be adjusted distance wise relative to the mower housing and held by the thumb screws 80 while the adjustment on the operating end of the boom at the bolts 86, 88 permits the cutter to be adjusted as to height and angularity relative to the mower housing and thereby to the ground. Moreover, it will be observed that the manner of coupling the two boom members 76, 78 permits indexing of the latter so that the driven or operating end of the flexible drive shaft can be positioned in both a front corner and front middle edger position (see FIGS. 1 and 6) and both a side and front trimmer position (see FIGS. 3 and 5).

Thus it can be seen that the preferred embodiment of the grass edger and trimmer attachment of the present invention has universal application to the conventional rotary lawn mower in that it is universally positional at its operating end for both edging and trimming yet is simply and easily mounted on top the mower housing requiring only a single access opening through the top of the housing to effect drive connection with the engine shaft and only a few attachement holes for the drive and boom mounting arrangements. Moreover, it will be appreciated that in addition to edging and trimming the present attachment it is also suitable for use in driving other implements in any of the available positions including the storage or rest position and also by attaching an extension thereto at the operating end shown.

The above described preferred embodiment is illustrative of the invention which may be modified within the scope of the appended claims.

The embodiments of the invention in which an exclusive property or privilege is claimed are defined as follows:

1. A universal grass edger and trimmer attachment adapted to be mounted on and driven by a rotary lawn mower having a mower housing, an engine mounted on top of and having an engine shaft extending vertically downward through the housing, and a mower blade fixed to the engine shaft beneath the housing: said attachment comprising first mounting means including selectively operable drive transmitting means adapted to be mounted as a unit on top of the housing, rotary flexible drive shaft means having a drive end mounted on said mounting means and having a driven end remote therefrom adapted to have a grass edger and trimmer fixed thereto, said drive transmitting means being adapted to extend vertically downward through an access opening formed in the top of the housing and being further adapted together with said engine shaft at a location beneath the housing and above the mower blade so as to provide a driving connection between said drive end of said flexible drive shaft means and said engine shaft on selective operation, and second mounting means having support means supporting said driven end of said flexible drive shaft means and having manually adjustable mounting means remote from said support means adapted to be mounted on top of the housing for providing manual positioning of said support means and driven end of said flexible drive shaft means in a storage position on top of the housing and one operating position in front of the housing and another operating position to one side of the housing.

2. A universal grass edger and trimmer attachment adapted to be mounted on and driven by a rotary lawn mower having a mower housing, an engine mounted on top of and having an engine shaft extending vertically downward through the housing and mower blade fixed to the engine shaft beneath the housing: said attachment comprising first mounting means including selectively operable drive transmitting means adapted to be mounted as a unit on top of the housing, rotary flexible drive shaft means having a drive end mounted on said mounting means and having a driven end remote therefrom adapted to have a grass edger and trimmer fixed thereto, said drive transmitting means being adapted to extend vertically downward through an access opening formed in the top of the housing and being further adapted together with said engine shaft at a location beneath the housing and above the mower blade so as to provide a driving connection between said drive end of said flexible drive shaft means and said engine shaft on selective operation, second mounting means having support means supporting said driven end of said flexible drive shaft means and having manually adjustable mounting means remote from said support means adapted to be mounted on top of the housing for providing manual positioning of said support means and driven end of said flexible drive shaft means in a storage position on top of the housing and one operating position in front of the housing and another operating position to one side of the housing, and said second mounting means further including both manually adjustable distance adjustment means and heighth adjustment means for respectively providing manual distance and heighth adjustment of said driven end of said flexible drive shaft means relative to the housing.

3. A universal grass edger and trimmer attachment adapted to be mounted on and driven by a rotary lawn mower having a mower housing, an engine mounted on top of and having an engine shaft extending vertically downward through the housing, and a mower blade fixed to the engine shaft beneath the housing: said attachment comprising first mounting means including selectively operable drive transmitting means adapted to be mounted as a unit on top of the housing, rotary flexible drive shaft means having a drive end mounted on said mounting means and having a driven end remote therefrom adapted to have a grass edger and trimmer fixed thereto, said drive transmitting means being adapted to extend vertically downward through an access opening formed in the top of the housing and being further adapted together with said engine shaft at a location beneath the housing and above the mower blade so as to provide a driving connection between said drive end of said flexible drive shaft means and said engine shaft on selective operation, second mounting means having support means supporting said driven end of said flexible drive shaft means and having manually adjustable mounting means remote from said support means adapted to be mounted on top of the housing for providing manual positioning of said support means and driven end of said flexible drive shaft means in a storage position on top of the housing and one operating position in front of the housing and another operating position to one side of the housing, said second mounting means further including both manually adjustable distance adjustment means and heighth adjustment means for respectively providing manual distance and heighth adjustment of said driven end of said flexible drive shaft means relative to the housing, and said second mounting means further including manually operable indexing means for providing manual indexing of said support means and driven end of said flexible drive shaft means to both an edger position and a trimmer position in both said operating positions.

4. A universal grass edger and trimmer attachment adapted to be mounted on and driven by a rotary lawn mower having a mower housing, an engine mounted on top of and having an engine shaft extending vertically downward through the housing, and a mower blade fixed to the engine shaft beneath the housing: said attachment comprising first mounting means including selectively operable drive transmitting means adapted to be mounted as a unit on top of the housing, rotary flexible drive shaft means having a drive end mounted on said mounting means and having a driven end remote therefrom adapted to have a grass edger and trimmer fixed thereto, said drive transmitting means being adapted to extend vertically downward through an access opening formed in the top of the housing and being further adapted together with said engine shaft at a location beneath the housing and above the mower blade so as to provide a frictional driving connection between said drive end of said flexible drive shaft means and said engine shaft on selective operation, second mounting means comprising an arm having support means at one of two ends supporting said driven end of said flexible drive shaft means and having manually adjustable ball and socket mounting means at the other end adapted to be mounted on top of the housing for providing manual positioning of said support means and driven end of said flexible drive shaft means in a storage position on top of the housing and one operating position in front of the housing and another operating position to one side of the housing as determined by said arm engaging and resting in upwardly facing angularly spaced slots included in said ball and socket mounting means, said arm including manually adjustable distance adjustment means for providing manual distance adjustment of said support means and driven end of said flexible drive shaft means relative to the housing, said support means including manually adjustable heighth adjustment means for providing heighth adjustment of said driven end of said flexible drive shaft means relative to the housing, and said arm further including manually operable indexing means for providing manual indexing of said support means and driven end of said flexible drive shaft means to both an edger position and a trimmer position in both said operating positions.

* * * * *